(12) United States Patent
Yearham et al.

(10) Patent No.: US 6,347,937 B1
(45) Date of Patent: Feb. 19, 2002

(54) ROTARY KILN BURNER

(75) Inventors: Bruce Yearham, Dundas (CA); Gerald Plant, Nr. Worksop (GB)

(73) Assignee: ATS Spartec Inc., Burlington (CA)

( * ) Notice: Subject to any disclaimer, the term of this patent is extended or adjusted under 35 U.S.C. 154(b) by 0 days.

(21) Appl. No.: 09/488,934

(22) Filed: Jan. 21, 2000

(51) Int. Cl.$^7$ .................................................. F27B 7/10
(52) U.S. Cl. ........................ 432/114; 431/284; 431/285; 110/265
(58) Field of Search ............................... 432/103, 114; 431/181, 284, 285; 110/261, 262, 264, 265

(56) References Cited

U.S. PATENT DOCUMENTS

| | | | | |
|---|---|---|---|---|
| 2,888,804 A | * | 6/1959 | Yellott et al. | |
| 3,822,654 A | * | 7/1974 | Ghelfi | |
| 4,157,889 A | * | 6/1979 | Bonnel | |
| 4,206,712 A | * | 6/1980 | Vatsky | |
| 4,387,654 A | * | 6/1983 | Binasik et al. | |
| 4,428,309 A | * | 1/1984 | Chang | |
| 4,428,727 A | * | 1/1984 | Deussner et al. | |
| 4,523,530 A | * | 6/1985 | Kaminaka et al. | |
| 4,551,090 A | * | 11/1985 | Leikert et al. | |
| 4,602,571 A | * | 7/1986 | Chadshay | |
| 4,838,185 A | * | 6/1989 | Flament | |
| 5,178,533 A | * | 1/1993 | Collenbusch | |
| 5,299,512 A | * | 4/1994 | Olsen | |
| 5,431,114 A | * | 7/1995 | Morita et al. | |
| 5,651,320 A | * | 7/1997 | Leisse et al. | |
| 6,196,142 B1 | * | 3/2001 | Ohlsen | 110/261 |

FOREIGN PATENT DOCUMENTS

| GB | 704901 | * | 3/1954 |
|---|---|---|---|
| JP | 0102005 | * | 6/1983 |

* cited by examiner

Primary Examiner—Gregory Wilson
(74) Attorney, Agent, or Firm—Ingrid E. Schmidt

(57) ABSTRACT

A direct coal fired burner system for a rotary kiln in which the burner has a multi-barrel construction through which primary air for conveying coal is heated with tertiary air sourced from the rotary kiln, and the shape of the emerging flame is controlled by a first annulus of swirling tertiary air adjacent the primary airstream and by a second annulus of laminar tertiary air defining an outer envelope for the flame. The volume and relative velocities of air in the tertiary air supplies are all controllable through the use of respective dampers provided in tertiary air supply conduits.

14 Claims, 3 Drawing Sheets

ROTARY KILN BURNER

FIELD OF THE INVENTION

This invention relates to a solid fuel burner for a rotary kiln and particularly relates to a direct coal firing system using a burner with a multi-barrel construction.

BACKGROUND OF THE INVENTION

In a direct coal firing system, hot air is drawn from a rotary kiln hood and is used to dry coal before it is sent to a mill for pulverization. The pulverized coal is entrained in a primary airflow for conveying the coal to a burner, the airflow also supplying 35 to 45% of stoichiometric air requirements for combustion of the coal. The balance of the stoichiometric requirements is supplied by a super heated secondary air flow contained by a kiln hood at the discharge end of the rotary kiln.

In indirect firing systems, pulverized coal is separated from the air required in the pulverizing mill using a cyclone or the like and the coal is stored so that it can be withdrawn as and when required. Coal and primary air firing rates are independent of the coal pulverizing mill and the volume of relatively cool primary air used to convey the coal to the burner is kept to a minimum so as not to exceed 20% of stoichiometric air requirements and thereby improve burner efficiency. Because of improved efficiency, indirect firing systems are generally preferred over direct firing systems and new rotary kiln installations usually include the infrastructure required to support an indirect coal firing system.

While many improvements have been made to burners for indirectly fired rotary kiln installation to still further increase efficiencies, very little effort has been devoted to improving the efficiency of direct fired rotary kiln installations, many of which continue to operate throughout the world at margins which cannot justify the cost of modifying the installations to accommodate the additional equipment required to support an indirect fired burner system.

Some improvements to indirect fired burner systems include pre-heating primary air with recirculated flue gas as in U.S. Pat. No. 4,387,654. In U.S. Pat. No. 4,206,712, a multi-barrel burner construction with a tertiary warm air supply for preheating a coarse coal fraction is disclosed. A small quantity of high-pressure, high velocity control air is directed at the fuel stream through a swirling air annulus to create and maintain a turbulent region around the tip of the burner nozzle. The quantity of air is varied from between 5 to 15% of stoichiometric air requirements.

In U.S. Pat. No. 4,838,185, a cool air jacket defined by a third barrel in the burner is provided to isolate a swirling jet of burning gases from the wall of the combustion chamber so that combustion can take place without damage to its walls and in U.S. Pat. No. 5,299,512, it is submitted that it is preferable to introduce primary air, in an axial direction to avoid rotation of the primary air stream altogether.

There are thus widely divergent views on whether spiral air deliveries are desirable in indirect coal fired burners and since the volumes of primary air fed into an indirect fired burner are significantly lower than those required in direct fired burners, the fluid flows and dynamics also differ considerably. Any teachings found in these prior art devices are clearly inappropriate for use in direct coal fired burners.

An object of this invention is to provide a system which can easily be integrated into existing direct coal fired burner installations to improve their efficiency without any significant capital investments.

SUMMARY OF THE INVENTION

In accordance with the invention, there is provided a direct coal fired burner system for a rotary kiln in which the burner has a multi-barrel construction through which primary air for conveying coal is heated with tertiary air sourced from the rotary kiln, and the shape of the emerging flame is controlled by a first annulus of swirling tertiary air adjacent the primary airstream and by a second annulus of laminar tertiary air defining an outer envelope for the flame. The volume and relative velocities of air in the tertiary air supplies are all controllable through the use of respective dampers provided in tertiary air supply conduits.

BRIEF DESCRIPTION OF THE DRAWINGS

In order that the invention may be more clearly understood, a preferred embodiment is described with reference to the accompanying drawing(s), in which.

DESCRIPTION OF PREFERRED EMBODIMENT WITH REFERENCE TO DRAWING

Figure 1:
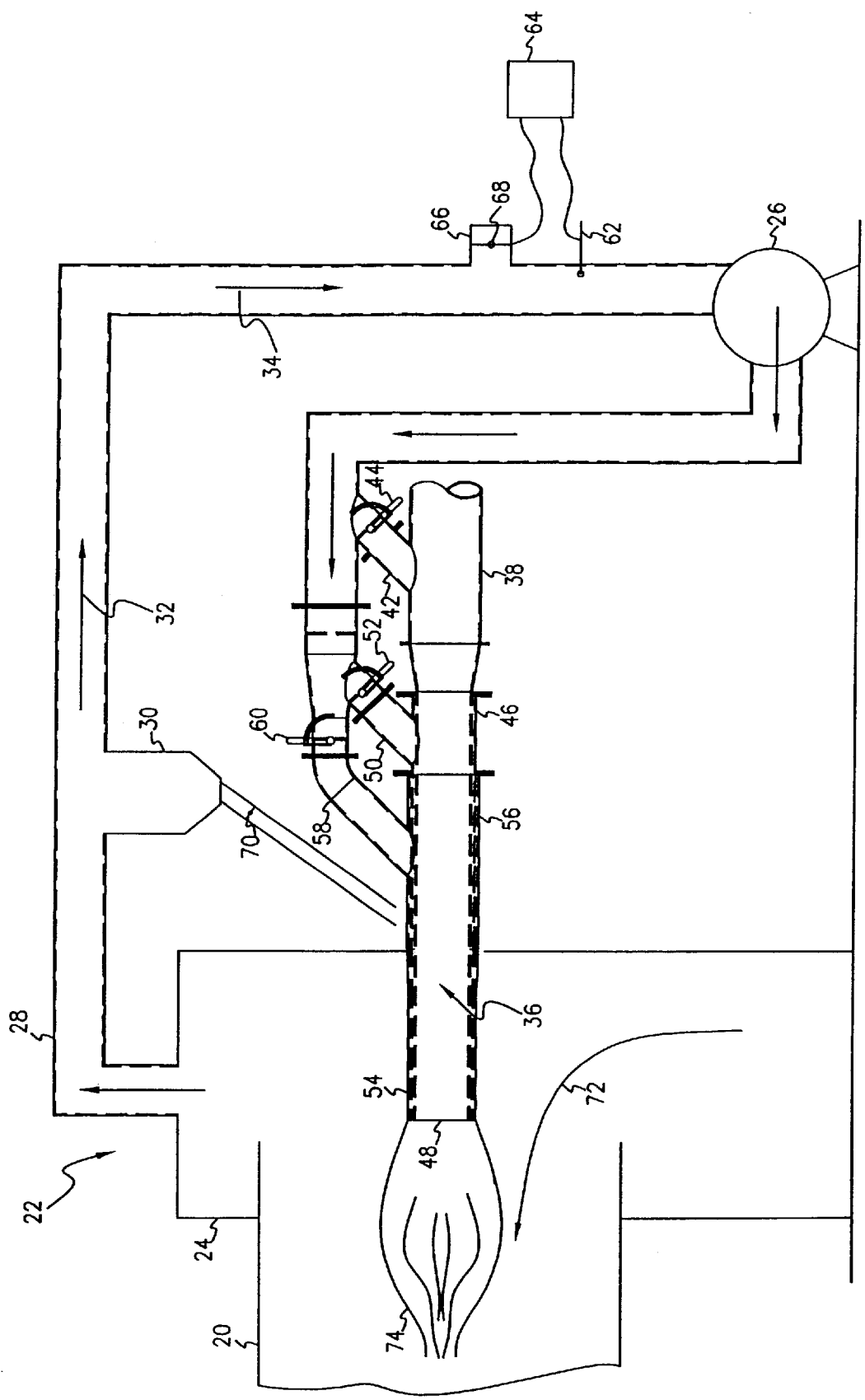
FIG. 1 is a schematic illustration of a rotary kiln burner system in accordance with the invention.
Figure 2:
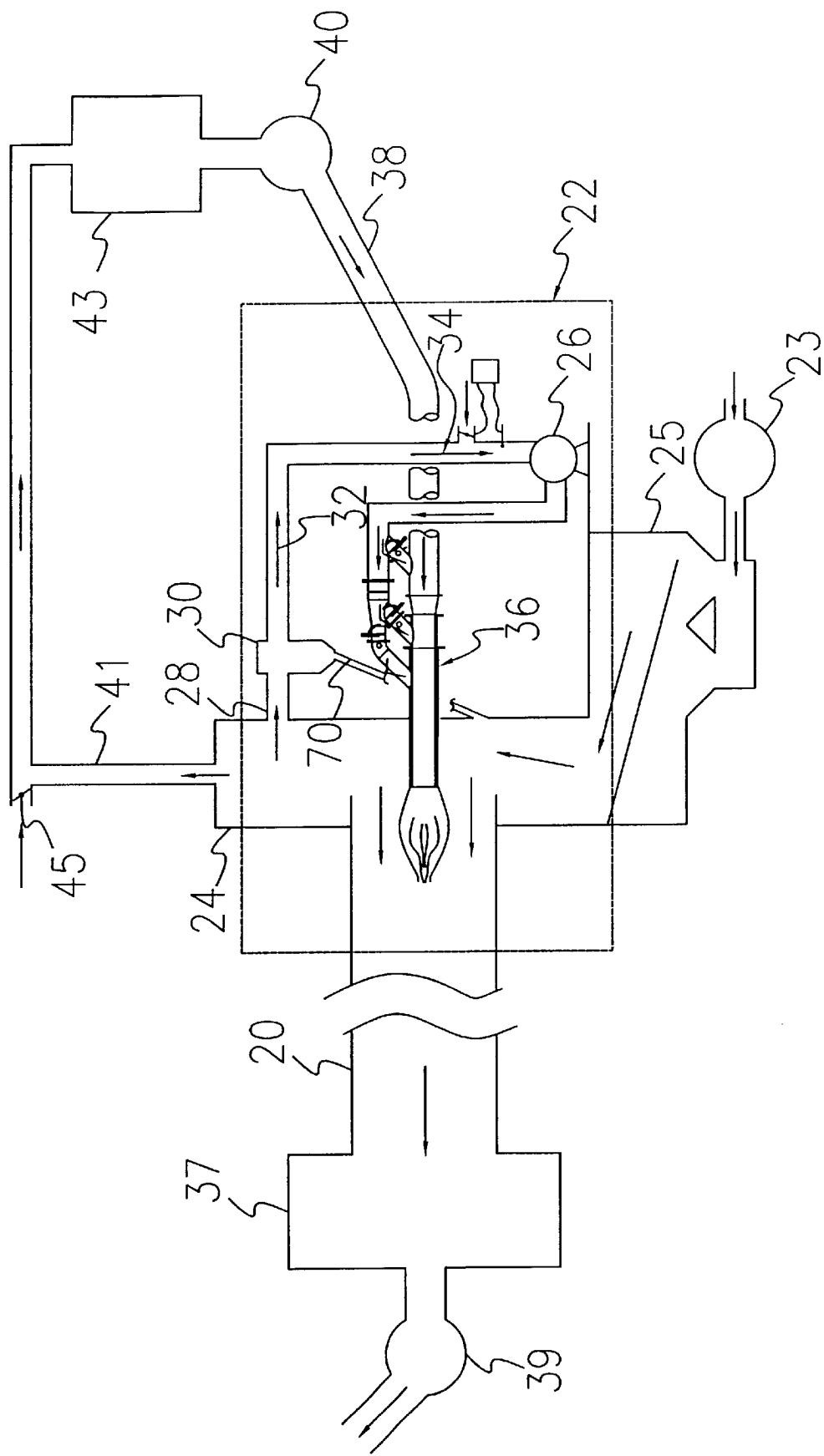
FIG. 2 is a schematic illustration, drawn to a smaller scale, of the burner system of FIG. 1 integrated into a rotary kiln installation.

A burner system for heating a rotary kiln designated by numeral 20 is generally designated by reference numeral 22 in FIG. 1 of the accompanying drawings. Only the discharge end of the rotary kiln 20 is shown in FIG. 1. As is common, the rotary kiln 20 terminates in a kiln hood 24 or plenum which is disposed over the discharge end of the rotary kiln 20 and which receives hot air which is blown by means of fan 23 through hot clinker emerging from the rotary kiln 20 into a clinker cooler 25 (FIG. 2). A hot air pipe 28 is coupled to the kiln hood 24 and supplies hot dusty air having a temperature of up to 1600° F. to a dust cyclone 30 for removing particulates from the air and from which dust is returned to the kiln hood 24. Clean hot air emerging from the cyclone 30 as indicated by arrows 32, 34 passes through the hot high pressure air fan 26 before being supplied to a burner generally indicated by reference 36.

The rotary kiln 20 is disposed at the feed end in a smoke chamber 37 operatively connected to an induced draft fan 39. Because the rotary kiln 20 forms part of a direct coal fired system, some hot air from the kiln hood 24 is directed through conduit 41 into a coal mill 43 and into the burner 36. A damper 45 upstream from the coal mill 43, is provided in the conduit 41 to cool the air in the conduit, as necessary. Coal fines leave the coal mill 43 through a coal mill fan 40 where they are discharged into a fuel supply conduit 38.

The burner 36 comprises a number of concentric pipes disposed so as to extend axially into the discharge end of the rotary kiln 20.

The burner 36 comprises a first primary conduit 38 made of 310 stainless steel and having a 12–14 inch nominal diameter. Typically, the conduit 38 has a length of 18 feet and defines the primary conduit for receiving primary air and fuel for combustion. The fuel supplied to the first conduit 38 comprises minus 200 mesh coal fines or petroleum coke or combinations of these and may include auxiliary fuels such as fuel oils or natural gas. The coal fines are supplied directly to the burner 36 from the coal mill 43, without any intermediate storage, through the primary fuel supply conduit 38 which typically will supply 35 to 45% of the stoichiometric air required for combustion. Such high volumes of primary air are typical of direct fired coal burners as starving the air supply would otherwise create back pressures in the coal mill and disrupt the coal supply. Because the coal in the coal mill may have varying levels of humidity, the temperature of the primary air will often fluctuate but is typically about 200° F.

In accordance with one aspect of the invention, hot tertiary air is supplied from hot air pipe 28 into a first hot air pipe branch 42 in fluid communication with the hot air pipe 28 and the first conduit 38. A manually set butterfly valve or damper 44 is provided in the first hot air pipe branch 42 to control the volume of air supplied.

Figures 3, 4:
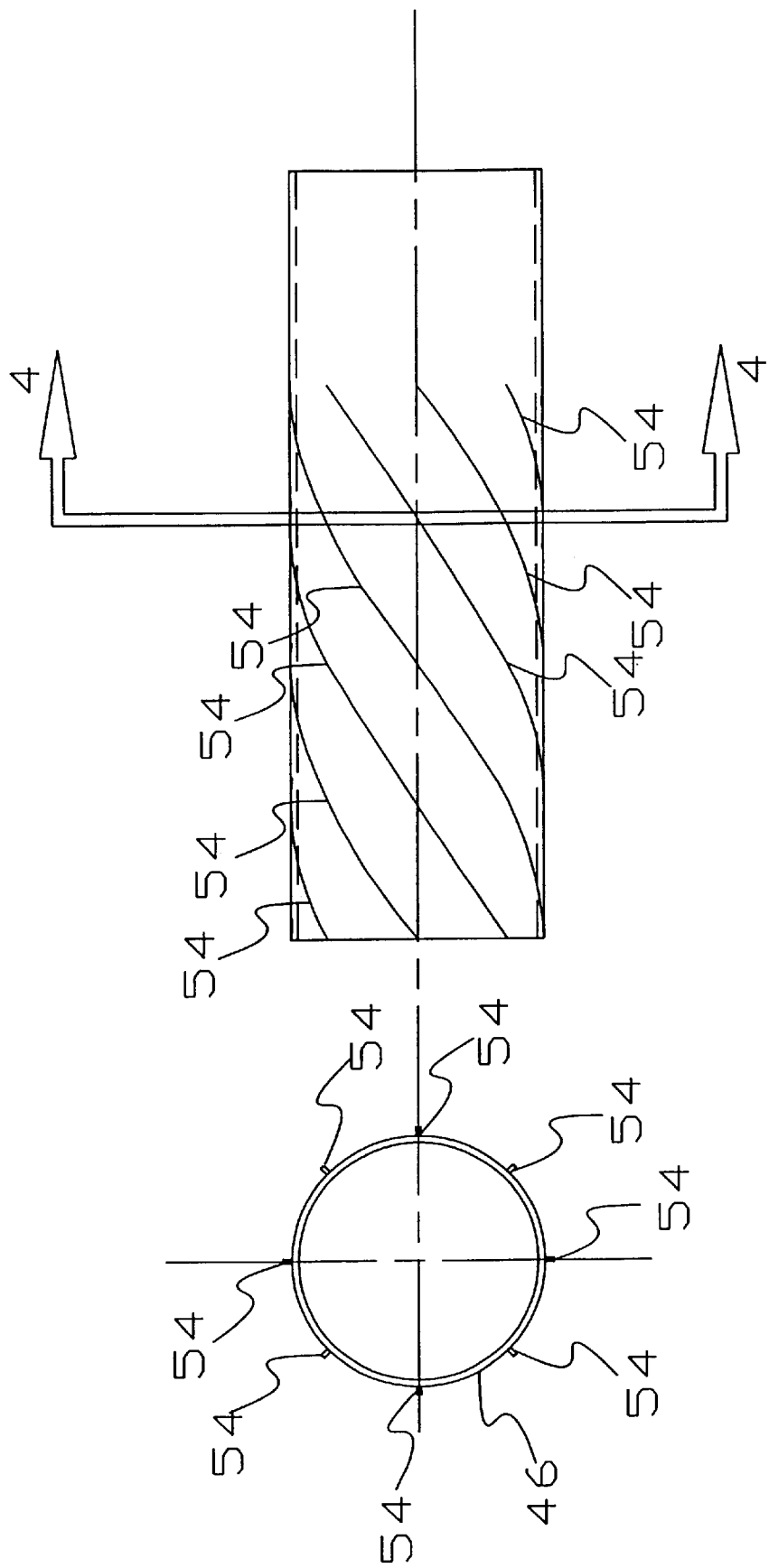
FIG. 3 is a longitudinal sectional view of a second conduit forming part of a burner for a rotary kiln.
FIG. 4 is a cross-section of the conduit of FIG. 3 taken on line 4—4.

A second conduit 46 axially receives the first conduit 38 and extends between an intermediate portion of the conduit 38 and a nozzle 48 for the burner 36 which is disposed inside the plenum 24. The second conduit 46 is, like the first conduit 38, in fluid communication with the hot tertiary air pipe 28 by means of a second hot air pipe branch 50. A butterfly valve 52 is provided in the second hot air pipe branch 50 to control the volume of hot air supplied to the second conduit 46. Adjacent to the nozzle 48, the second conduit 46 has a series of eight external scroll vanes 54 with a wrap of 180° (FIGS. 3 & 4) and which have a pitch relative to the middle of the conduit 46 of about 45°. The vanes 54 extend inwardly over a length of about 18 inches away from the nozzle 48. The second conduit is also fabricated from 310 stainless steel and has a nominal internal diameter of 13–15 inches while the scroll vanes 54 are constructed from flat bar having a cross-section of a ½ inch to ¼ inch.

A third conduit 56 axially receives the second conduit 46 and extends between an intermediate portion of the second conduit 46 and the nozzle 48. The third conduit 56 has a respective third hot air pipe branch 58 and butterfly valve 60 through which hot tertiary air is supplied from the hot air pipe 28. The third conduit 56 is also made of 310 stainless steel and has a nominal internal diameter of 14–16.0 inches.

The hot high pressure fan 26 has been specially designed to operate at a high temperature of up to 1400° F. and high pressure of 40 inch water gauge. It is currently available from Garden City. Because of the maximum operating temperature of the fan 26 is 1000° F., the temperature of the hot air upstream from the fan must be regulated. Accordingly, a thermocouple 62 is disposed upstream from the fan 26 and the thermocouple 62 is electrically connected to a controller 64 through which ambient air may be admitted into a fresh air duct 66 having a butterfly valve 68 and disposed in the hot air pipe 28 upstream of the fan 26.

In use, the tertiary air fan 26 draws hot air from the kiln hood 24. The hot air is cleaned through the cyclone 30 to remove any heavy dust particles. The hot air is delivered to the kiln burner 36 for the purpose of shaping the flame and also to boost the temperature and velocity of the primary air supplied to the first conduit 38.

The second or middle conduit 46 has relatively long scroll swirl vanes 54 which modify the pulverized fuel flame shape and intensity by increasing or decreasing the amount of swirl air to produce short through long flames, respectively.

The outer or third conduit 56 carries hot high velocity laminar air and by increasing the air flow in the third conduit and also reducing the air flow in the second conduit 46, a longer cooler flame may be produced. All adjustments to air flow in the first, second and third conduits are done using the manual butterfly valves 44, 52, 60. Before starting the hot high pressure fan, a blanking plate may be installed into the first hot air pipe branch 42 for safety considerations and all of the aforementioned hot air butterfly valves 44, 52, 60 are closed.

With a double flap gate air seal 70 at the bottom of the dust cyclone 30 properly balanced, the hot high pressure fan 26 is put into operation once normal operating temperatures are achieved by combustion of fuel and primary air in the first conduit 38. Flame shaping procedures may then be started by adjusting the butterfly valves 52, 60. A greater flow of air delivered to the second conduit 46 will create a flame which is short and bushy while a greater flow of air through the third conduit 56 will produce a flame which is long and pencil shaped.

Removal of a blanking plate and adjusting the butterfly valve 44 allows hot tertiary air into the first conduit 38 and this is adjusted subject to the correct balance of combustion conditions suited to the product being produced. It will be understood that the tertiary air fan 26 must be maintained in operation in order to eliminate the possibility of any fuel dust leaking into the hot air pipe 28.

In order to shut down the burner, the butterfly valves 44, 52, 60 are closed and a blanking plate may be installed. The hot high pressure fan 26 is closed after normal shut down procedures for the burner 36.

It will be understood that in prior art devices using solid fuels which have a swirling device in the burner, there has been a tendency to deflect the solid fuel radially in order to mix with it the incoming parallel flow of secondary air indicated in the drawing by arrow 72. In such systems, the coarser fractions of solid fuel gain sufficient momentum to tend to exit the flame 74 which leads to delayed combustion and particle impingement on the refractories of the kiln 20.

By contrast, the burner 36 in accordance with the invention uses a long scroll swirling device which causes hot tertiary air to swirl around the main center jet of pulverized fuels, quickly entraining and driving inwards the hot secondary air into the outer regions of the flame which are air starved and combustible gas rich. The central axis of the main fuel jet is largely undisturbed and retains its position to the kiln feed bed to minimize radiant heat transfer from flame to bed. In part, aspiration of superheated secondary air (800° F. to 1000° F.) is achieved by maintaining a high pressure high velocity air flow in the second conduit 46 and the third conduit 56 such that the velocity is approximately 90 meters per second with an air pressure of 39 inches water gauge while the air velocity in the first conduit 38 is approximately 35 to 45 meters per second. By adjusting the air flow in the second and third conduits 46, 56, the back pressure or the flow rate of the primary air and pulverized fuel exiting the coal mill in a direct firing process is not affected. Otherwise, any increase in back pressure on the primary air and pulverized fuel supply in the direct firing process would slow down or cripple the pulverized solid fuel system resulting in decreased firing rates or even a kiln shut down.

It it expected that the burner in accordance with the invention may be used to burn existing fuels at higher temperatures and to stabilize the combustion of high ratios of petroleum coke in petroleum fuel mixtures and also to burn lower quality solid fuels more effectively so as to deliver from 100 to 500 million BTU/hr.

It will be understood that several variations may be made to the above described embodiment of the invention within the scope of the appended claims. In particular, it will be appreciated that the temperature of hot tertiary air is limited only by the currently available technology for providing a hot high pressure fan and that this temperature could increase if such hot air could be accommodated. The burner construction described above is subject to modification and not limited by the materials of construction indicated.

It will be appreciated that the system described will be adapted to improve burning efficiency in existing direct coal burners without any significant disruptions.

What is claimed is:

1. A burner system for heating a rotary kiln, the burner system including a burner coupled to a supply of hot tertiary air from the rotary kiln, and terminating in a nozzle disposed in a hot secondary air supply defined by a kiln hood disposed at an outlet for the rotary kiln, the burner having a first conduit for receiving pulverized solid fuel and primary air supplying at least 30% of stoichiometric requirements for combusting the solid fuel, a second conduit axially receiving the first conduit therethrough, and extending between an intermediate portion of the first conduit and the nozzle, the second conduit having at least one internal scroll adjacent the nozzle for imparting a swirling motion to air exiting from the second conduit, a third conduit axially receiving the second conduit therethrough, and extending between an intermediate portion of the second conduit and the nozzle, each of the first, second, and third conduits having a respective tertiary hot air supply and respective damping means for independently controlling the volume of hot tertiary air from the rotary kiln supplied to said conduits, a hot high pressure fan for receiving hot tertiary air from the rotary kiln and delivering hot tertiary air to said first, second, and third conduits, a damper in a fresh air duct disposed upstream from said hot high pressure fan and in fluid communication with said supply of hot tertiary air for receiving ambient air to cool the hot tertiary air, as required, the volume of hot tertiary air through each of said first, second, and third conduits being adjustable to allow the air velocity in the second and third conduits to exceed the air velocity in the first conduit by a factor of at least 2:1.

2. A burner system according to claim 1 in which the second conduit has a plurality of long scroll vanes for swirling air, the vanes having a wrap of at least 150°.

3. A burner system according to claim 2 in which the pitch of the vanes is about 45°.

4. A burner system according to claim 2 in which the scroll vanes have a wrap of about 180°.

5. A burner system according to claim 2 in which the scroll vanes extend inwardly over a length x away from the nozzle, the second conduit having a nominal internal diameter y, and the ratio x/y being in the range of 1.4 to 1.2.

6. A burner system according to claim 1 in which the internal wall of the third conduit is substantially smooth so that the air flow through the third conduit is substantially laminar.

7. A method of operating a burner system for heating a rotary kiln, the burner system including a burner coupled to a supply of hot tertiary air from the rotary kiln, and terminating in a nozzle disposed in a hot secondary air supply defined by a kiln hood disposed at an outlet for the rotary kiln, the burner having a first conduit for receiving pulverized solid fuel and primary air, a second conduit axially receiving the first conduit therethrough, and extending between an intermediate portion of the first conduit and the nozzle, the second conduit having at least one internal scroll adjacent the nozzle imparting a swirling motion to air exiting from the second conduit, a third conduit axially receiving the second conduit therethrough, and extending between an intermediate portion of the second conduit and the nozzle, the air emerging from third conduit having laminar flow characteristics, each of the first, second, and third conduits having a respective tertiary hot air supply and respective damping means for independently controlling the volume of hot tertiary air from the rotary kiln supplied to said conduits, a hot high pressure fan for receiving hot tertiary air from the rotary kiln and delivering hot tertiary air to said first, second, and third conduits, a damper in a fresh air duct disposed upstream from said hot high pressure fan and in fluid communication with said supply of hot tertiary air, receiving ambient air to cool the hot tertiary air, as required, to a temperature which is less than the operating temperature of the hot high pressure fan, in which the volume of primary air supplied through said first conduit is at least 30% of stoichiometric requirements for combusting solid fuel, and the volume of hot tertiary air supplied through each of said first, second, and third conduits is adjusted so that the air velocity in each of the second and third conduits exceeds the air velocity in the first conduit by a factor of at least 2:1.

8. A method according to claim 7 in which the temperature of the hot tertiary air is maintained at a maximum of 1400° F.

9. A method according to claim 7 in which the volume of hot tertiary air admitted to the first conduit is varied in accordance with the humidity of pulverized solid fuel supplied to the first conduit.

10. A method according to claim 7 in which the volume of hot tertiary air admitted to the second conduit is increased to create a shorter, bushier flame.

11. A method according to claim 7 in which the volume of hot tertiary air admitted to the third conduit is increased to create a longer, cooler flame.

12. A method according to claim 7 in which the air velocity in the first conduit is maintained between 35 and 45 m/sec and the air velocities in the second and third conduits are operated at approximately 90 m/sec.

13. A method according to claim 7 in which the hot tertiary air supplied in each of second and third conduits does not exceed 10% of stoichiometric air required for combustion.

14. A method according to claim 7 in which the hot tertiary air supplied in each of the second and third conduits is approximately 6% of stoichiometric air required for combustion.

* * * * *